Patented Mar. 30, 1943

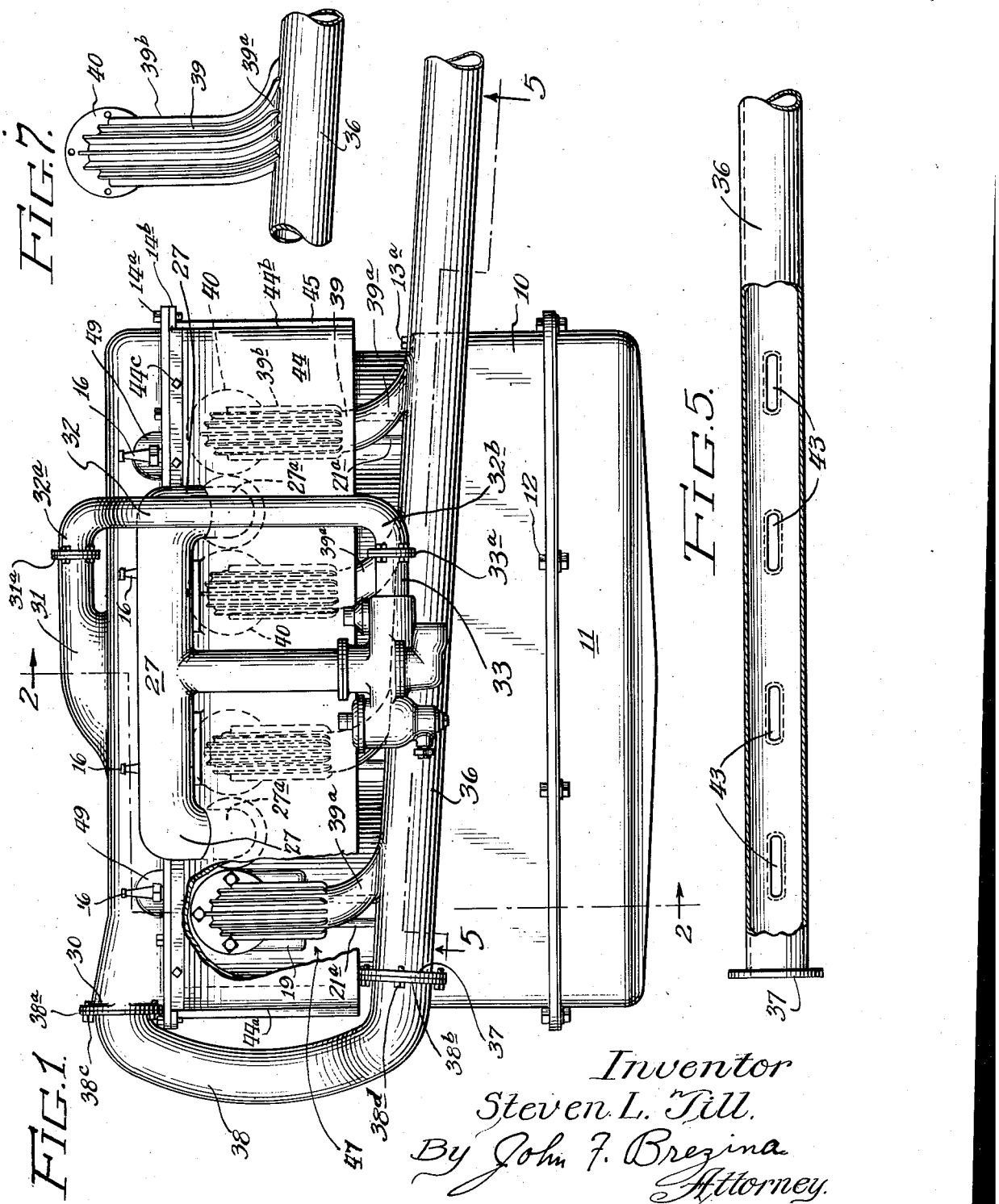

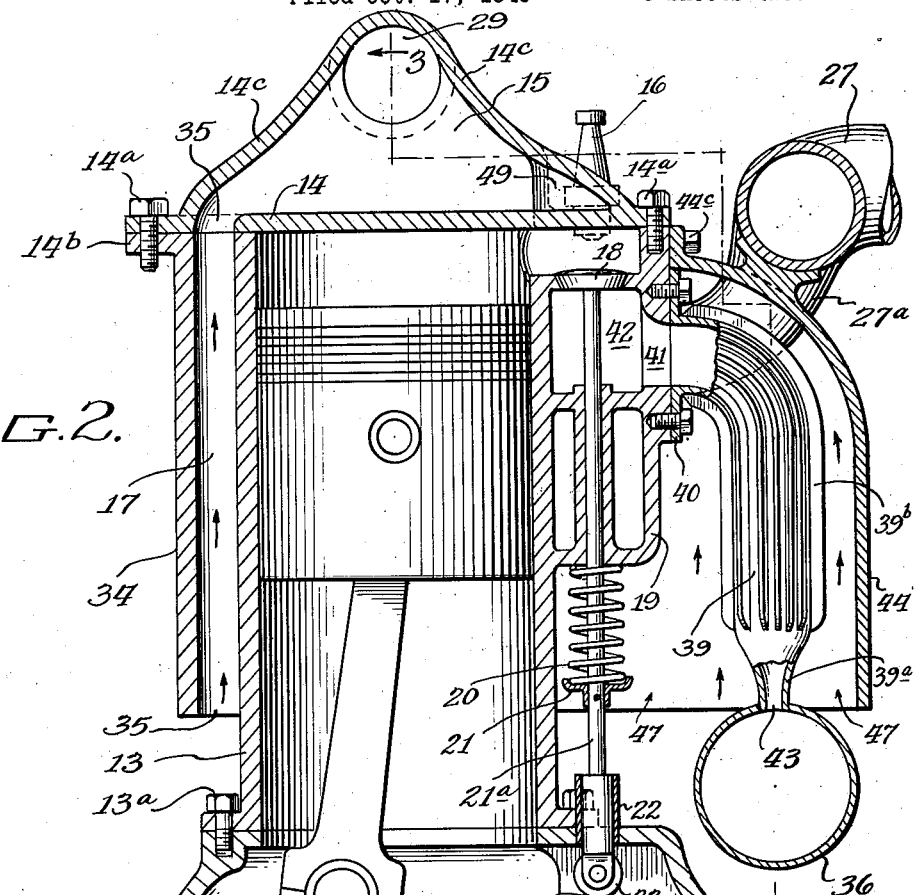
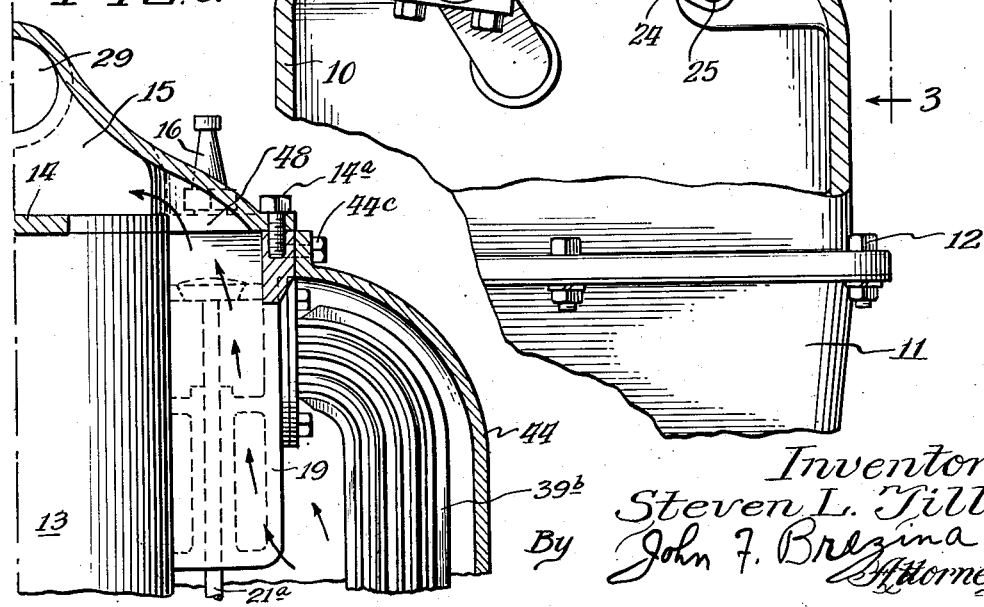

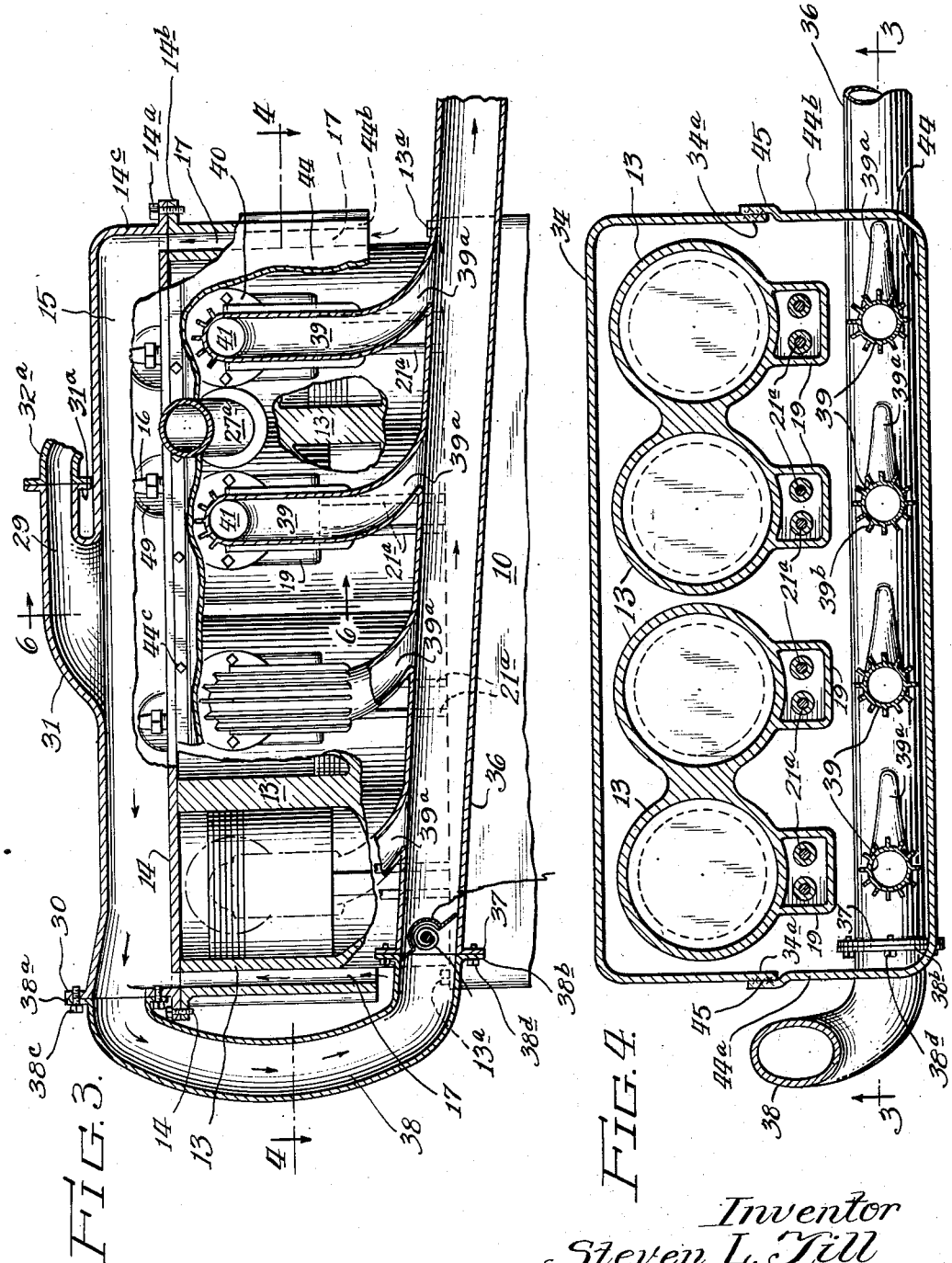

2,315,462

UNITED STATES PATENT OFFICE 2,315,462

COMBINED ENGINE AND COOLING SYSTEM THEREFOR

Steven L. Till, Chicago, Ill., assignor of one-half to John O. Enell and Michael M. Phillips, both of Cook County, Ill.

Application October 17, 1940, Serial No. 361,517

1 Claim. (Cl. 123—171)

My invention is directed to and relates to a novel cooling system for internal combustion engines, and relates more particularly to that type of system in which the cylinders are cooled by heat exchange therebetween and air passing in contact with the outside surfaces thereof.

It is an object of my invention to provide an efficient air cooling system for internal combustion engines, particularly those of motor-driven vehicles, with novel structural features, characteristics, and elements, which structural features and elements present novel combinations themselves as well as novel combinations with the engine with which they are associated and cooperate.

An important object of my invention is the provision of an internal combustion engine in combination with a cooling jacket, means providing for circulating the entering air in heat exchange relation with the cylinders of the engine, structural elements and means whereby a portion of the heated air may selectively be employed for mixing within the carborating device, and structural means and system of operation whereby partial vacuum areas created by the exhaust engine gases will maintain a continuous circulation of air in multitudinous paths in heat exchange relation with the cylinders and associated engine parts.

A further object of my invention is to provide a structural means, which may or may not be in the form of a separable and mountable attachment, and which may be mounted and secured upon an internal combustion engine for providing compartments and paths for circulation of air in heat exchange relation with the cylinders, and which means provides for vacuum-impelled cooling air circulation.

Other and further objects of my invention will be apparent from the following description, drawing disclosures, and appended claims.

This invention (only in one illustrated, preferred form) is illustrated and described in the following specification.

Referring to the drawings:

Fig. 1 is a side elevational view illustrating an internal combustion engine embodying the structural features of my invention, for carrying out the herein described system of operation.

Fig. 2 is an enlarged vertical cross-sectional view, with parts broken away, taken on line 2—2 of Fig. 1, and showing the combustion cylinder, the engine block, and associated parts.

Fig. 3 is a longitudinal view taken on a vertical plane through the center of the engine and taken on line 3—3 of Fig. 2, showing parts of the metal apron or guard broken away.

Fig. 4 is a horizontal, cross-sectional view taken on line 4—4 of Fig. 3, and showing the various upwardly extending air passages in cross-section.

Fig. 5 is an enlarged cross-sectional view taken on line 5—5 of Fig. 1 and showing from below the exhaust ports at the junctures of the respective exhaust pipes and the common exhaust pipe.

Fig. 6 is a vertical cross sectional view of the upper corner of Fig. 2 and illustrating the air path and passage between the area below the hood and the head chamber and passage.

Fig. 7 is an enlarged fragmentary side elevation showing a modified form of individual exhaust conduit with fins extending to the main exhaust.

Referring to the drawings, numeral 10 designates the lower portion of an engine block which is cast and heat-treated in the usual manner, and which may take any one of a number of convention forms and designs. The lower portion of block 10 is suitably flanged as indicated and provided with the demountable, conventional, crank-case oil receptacle 11, which is suitably secured to the flange of the lower portion of the engine block by a plurality of spaced apart nuts and bolts 12, which pass through correspondingly spaced apart apertures in the flange of said oil receptacle and said block.

The upper portion of the cylinder block, which is designated by reference numeral 13, which part defines the suitably positioned and spaced apart, usually vertical cylinders in which the combustion takes place, is in the illustrated form, secured by a plurality of suitable bolts 13a to the crankcase or lower portion of the block, said bolts passing through suitable apertured flanges along the sides of the upper cylinder block portion 13 and threading into correspondingly spaced apart apertures in the crank-case portion 10. It is to be understood that the described construction, insofar as the usually termed engine or cylinder block is concerned, may assume any one of many known forms and be combined with and satisfactorily operable with my cooling system and the fundamental structural features which I provide and herein illustrate.

Referring to Figs. 2 and 3, it will be noted that the illustrated engine is provided with a removable metal engine head 14, which is suitably secured with an interposed gasket (not shown) upon the upper end of the engine block proper by a plurality of spaced apart head bolts 14a, which thread into suitably and correspondingly spaced apart apertures formed in a flange 14b, integral with the upper portion of the engine block. Said head 14 is, at its opposite side, likewise suitably secured by a plurality of threaded bolts 14a, one of which is shown in Fig. 2. The metal engine head is formed with a curved upper wall 14c which is illustrated as of arcuate transverse cross section, and this top wall may be either formed integrally and as a part of the head 14, or may comprise a separate casting appropriately and sealingly secured as by means of bolts 14a upon the substantially flat head portion 14. In Fig. 2, the upper wall portion 14c is shown as formed integrally and as a part of the head itself. This head 14 may take a form substantially similar to that of a common hollow engine head provided with longitudinal passages which passages in conventional engines provide means of circulating water through a conventional water cooling system.

Referring to the drawings, the longitudinally extending hollow passage forming the interior of the head 14 is designated by numeral 15. Said head 14, as illustrated, overlies the respective combustion chambers, a portion of which chambers extend over the respective fuel inlet and the alternately positioned exhaust valves, one of such exhaust valves 18 being illustrated in Fig. 2 and seating in a conventional conical seat of passaged mounting member 19, which may be formed integral with the cylinder block 13. The respective exhaust valves 18, as well as similarly constructed intake valves (the intake valves not being shown) are slidably mounted in the centrally passaged portions of the mounting member 19, preferably one exhaust valve and one intake valve on one member substantially as illustrated in Fig. 4. The valves are provided with closure springs 20 respectively, which are interposed between the passaged portions of the mounting member 19 and thrust bushings 21 secured on the lower portion of the valve stem 21a substantially as illustrated in Fig. 2.

The lower portions of the valve stems 21a are mounted for vertical slidable movement in a plurality of suitable bushings 22, one of which is shown in Fig. 2, and the lower bifurcated ends of said valve stems have rotatably mounted thereon rollers 23 which are respectively engaged by the spaced apart cams 24 of a conventionally constructed and conventionally mounted cam shaft 25, said cam shaft being driven in a conventional and well known manner by suitable gears from the crank shaft.

Referring again to Figs. 2 and 4, the engine block is provided with a plurality of vertically extending passages 17 which extend vertically in the engine block adjacent the respective combustion cylinders 13, four of such vertical passages 17 being illustrated in Fig. 4 at diametrically opposite sides respectively of each cylinder. In the vertical cross section view of Fig. 2, one of said vertically extending passages 17 is shown at the left roof, and defined on one side by the metal apron 34 and on the remaining sides by downwardly depending apron or flange 34, which metal apron 34 is shown in horizontal section in Fig. 4 and extending along the entire length and ends of the engine block. It will be noted that the depending metal apron 34 is of U-shaped cross section in Fig. 4 and extends so that its opposite ends terminate in vertically extending edges 34a secured as hereinafter described. The lower edge of this depending apron 34 terminates a short distance from the lower ends of the cylinders 13 of the engine block so as to provide air entrance openings and passages permitting the circulated air to be drawn upwardly along and in heat exchange relation with the walls of the respective cylinders 13 and to then pass through the openings indicated at 35 and into the interior chamber 15 of the hollow head 14.

Mounted in a suitably threaded aperture at proper positions in head 14 are the usual spark plugs 16 of conventional form (part of which are shown in Figs. 2 and 3), and normally connected to the battery, distributor, and generator as in a conventional power plant. It will be noted that the lower ends of the spark plugs project into the right end portion of the respective combustion chambers in positions substantially above the respective intake and exhaust valves and that spaced apart recesses 49 are provided in head 14 to provide for mounting the respective plugs in the usual manner.

Referring to Figs. 2 and 3, it will be noted that a fragment of the intake manifold is illustrated in cross-section and designated by numeral 27, said intake manifold having elbow-like portions 27a leading to and connected with fuel intake ports through which the fuel passes into correspondingly spaced apart and staggered intake chambers which are similarly positioned and in alignment with exhaust chambers 15.

The longitudinal circulated air chamber 15 formed by the head 14 extends over the entire length of the head as illustrated in Fig. 3. At its forward end the head 14 is provided with a substantially, centrally positioned outlet port 29, which is defined by a suitable annular flange 30.

The metal head 14 is also provided with an upwardly and horizontally extending lead-off conduit or pipe 31 which terminates in an apertured annular flange 31a, as clearly shown in Fig. 1. As clearly shown in Figs. 1 and 3, the mouth or inlet of the conduit 31 is formed relatively enlarged and defined by gradually flaring and outwardly converging wall so as to permit relatively free entry of circulated, warmed air into the said branch conduit pipe 31. An angularly bent conduit pipe 32, best shown in Fig. 1, having integral elbows 32a and 32b at its opposite ends, is so mounted that the annular flange of its upper elbow 32a is secured by suitable bolts as illustrated in Fig. 1 to the cooperating flange 31a, and the lower elbow 32b has its apertured annular flange secured to a cooperating annular flange 33a of an air inlet pipe 33, whose opposite end is secured to and communicated with the air intake chamber of a fuel carburetor (Fig. 1).

Reference numeral 36 designates a main exhaust pipe, which at its forward end terminates in an annular apertured flange 37. A return bend conduit 38 of substantially U-shape form and which terminates in suitable apertured flanges 38a and 38b respectively is connected by a plurality of suitable bolts 38c and 38d to the flange 30 surrounding air outlet port 29 and to the flange 37 at the forward end of the main exhaust pipe 36, as clearly illustrated in Fig. 1.

Reference numeral 39 designates a plurality of individual exhaust pipes and exhaust conduits, which correspond to the number of combustion chambers and their exhaust valves and which have their upper ends formed with integral apertured flanges 40 substantially as illustrated in cross section in Fig. 2, which exhaust conduit flanges are securely though removably mounted upon or over the respective exhaust ports 41 shown in cross section of Fig. 2. The exhaust ports 41 form outlets for the chambers 42 formed in the upper part of the mounting member 19 and on the outlet side of the exhaust valves, as illustrated in Fig. 2. The lower ends of the individual exhaust conduits 39 terminate in gradually curved and bent integral portions 39a, all of which are preferably reduced in cross sectional dimension and all of which are curved and directed in the common direction of travel of the exhaust gases in the main exhaust pipe 36. These curved reduced end portions 39a of the individual exhaust conduits 39 are suitably secured, as by welding, or other suitable securing means, over the respective spaced apart openings 43 formed as shown in Fig. 5 and formed in substantial spaced apart alignment in the upper wall portion of the main exhaust pipe 36. It is to be understood that while I have illustrated these exhaust openings 43 as elongated or slotted, that the shape thereof may be varied with equally satisfactory operation.

As indicated in Figs. 1, 2 and 4, the upper portions of the angular individual exhaust conduits 39 may be provided with a plurality of spaced apart integral fins 49 which may be spaced with respect to each other in various manners in order to be contacted by the circulated air drawn upwardly below the apron, flange or hood 44 which is mounted in the herein illustrated and described manner.

Metal hood 44 in horizontal section is of U-shaped cross section secured by a plurality of bolts 44c and having end portions 44a and 44b extending along and spaced from the ends of the engine block and along a plane just outside the individual exhaust conduits. The hood ends 44a and 44b are secured by welding, or any suitable securing means, i. e. bolts, to the end portions of apron 34 at joints 45 as shown in Fig. 4. It will be apparent that when mounted the hood 44 defines an air entrance opening 47 (Fig. 2) extending over the entire length of the engine block and which is communicated with the air passage 15 by a plurality of passages 48 as shown in Fig. 6. One of each such passages 48 lie between each two adjacent sets of mounting members 19 (which house the valves), thereby providing a plurality of free air paths or passages from below hood 44 to beneath the hood 15.

As shown in the drawings, reference numeral 49 designates a thermostatic valve element mounted on the forward portion of the main exhaust conduit as indicated. Said valve element is mounted on and operated by a bi-metal helical unit 50 which is so adjusted that the opening or closing or partial closing will be synchronized with the temperature of the engine and the desired degree of circulation of air through my described system.

It will be apparent that increased speed of the engine results in correspondingly more rapid air circulation and heat exchange between air and engine parts, this being brought about by the changes in the degree of partial vacuum maintained in the forward part of the exhaust system.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

In combination with an internal combustion engine having one or more combustion chambers and provided with fuel intake, gas exhaust means and means for regulating said fuel; a block containing a plurality of cylinders forming combustion chambers; an elongated hood mounted over the upper area above said cylinders and having a flange-defined inlet opening beyond the end of said cylinders, said hood having a flange-defined upper end opening and an upwardly and horizontally extending portion defining an intermediate air outlet port; a continuous depending metal apron secured to the lower edges of said hood and extending about said cylinders and spaced therefrom and providing a substantially continuous downwardly opening air inlet passage, said inlet opening of said hood communicating with said air inlet passage; a main exhaust pipe extending along the sides of said cylinders and terminating in a flanged end portion at its front end and having a plurality of spaced apart openings therein; an arcuate metal air conduit having one end secured to the forward air outlet end of said hood and having its other end connected to the front flanged end of said main exhaust pipe; a plurality of exhaust conduits communicatively connected at their upper ends with the exhaust ports of said cylinders respectively and having their lower ends curved in a rearward direction and communicatively connected with said spaced apart openings of said main exhaust pipe respectively; a thermostatically controlled valve mounted in the forward end of said main exhaust pipe and adapted to be regulated by the heat responsive means to control the opening thereof, said individual exhaust conduits from each of said engine exhaust ports being adapted to direct the gases exhausted into said main exhaust pipe in a generally rearward direction to thereby mainatin partial vacuum areas in said main exhaust pipe to thereby maintain, during engine operation, a circulation of air through said substantially continuous inlet passage and in heat exchange relation with said cylinders and through said hood and downwardly through said arcuate air conduit and outwardly through said exhaust pipe; and an air conduit connecting the opening of said intermediate upper opening of said hood and the air intake portion of a carburetor to thereby cause a part of the air heated by heat exchange with said cylinders to flow to said carburetor.

STEVEN L. TILL.